(12) United States Patent
Smith et al.

(10) Patent No.: US 6,982,860 B2
(45) Date of Patent: Jan. 3, 2006

(54) TECHNIQUE FOR FAULT ISOLATION AND TRANSIENT LOAD ISOLATION FOR MULTIPLE ELECTRICAL LOADS CONNECTED TO A COMMON ELECTRICAL POWER SOURCE

(75) Inventors: Scott L. Smith, Madison, AL (US); Steven M. Robinson, Madison, AL (US)

(73) Assignee: Adtran, Inc., Huntsville, AL (US)

( * ) Notice: Subject to any disclaimer, the term of this patent is extended or adjusted under 35 U.S.C. 154(b) by 277 days.

(21) Appl. No.: 10/293,141

(22) Filed: Nov. 13, 2002

(65) Prior Publication Data

US 2004/0090727 A1 May 13, 2004

(51) Int. Cl.
*H01C 7/12* (2006.01)

(52) U.S. Cl. ..................... 361/119; 361/111
(58) Field of Classification Search .............. 361/18, 361/86–88, 91.1, 91.2, 110, 111, 119, 118
See application file for complete search history.

(56) References Cited

U.S. PATENT DOCUMENTS

| 4,027,224 | A | * | 5/1977 | Beene | 363/16 |
| 4,254,305 | A | * | 3/1981 | Treiber | 379/324 |
| 4,343,971 | A | * | 8/1982 | Beene | 379/324 |
| 5,237,606 | A | * | 8/1993 | Ziermann | 379/413 |
| 6,396,673 | B1 | * | 5/2002 | Yancey et al. | 361/93.1 |
| 6,496,345 | B1 | * | 12/2002 | Smith | 361/93.9 |
| 6,665,404 | B2 | * | 12/2003 | Cohen | 379/413 |
| 6,690,792 | B1 | * | 2/2004 | Robinson et al. | 379/418 |

* cited by examiner

*Primary Examiner*—Brian Sircus
*Assistant Examiner*—Danny Nguyen
(74) *Attorney, Agent, or Firm*—Allen, Dyer, Doppelt, Milbrath & Gilchrist, P.A.

(57) ABSTRACT

A central office transceiver-installed current limiter and regulator provides fault isolation and transient load isolation in a wireline communication network, having multiple transceivers connected by respective span-powered wirelines to a common power source at the central office. Using a current-sense resistor and controlled switch in series with the wireline, the current-limiter and regulator processes input electrical power from the power source prior to coupling that power to a remote transceiver. To prevent overheating and substantial power dissipation in the current-limiting circuitry in the event of a prolonged fault condition, the controlled switch is alternately turned on and off.

21 Claims, 2 Drawing Sheets

TECHNIQUE FOR FAULT ISOLATION AND TRANSIENT LOAD ISOLATION FOR MULTIPLE ELECTRICAL LOADS CONNECTED TO A COMMON ELECTRICAL POWER SOURCE

FIELD OF THE INVENTION

The present invention relates in general to electrical power systems and subsystems of the type used for span-powering multiple telecommunication equipments, and is particularly directed to a new and improved fault isolation and transient load isolation scheme for use with multiple electrical loads (transceivers), that are connected by way of respectively different wireline links to a common power source installed at a facility, such as a central office.

BACKGROUND OF THE INVENTION

Local Exchange Carriers (LECs) within the telecommunication industry implement a variety of digital transmission systems to service their customers. As diagrammatically illustrated in FIG. 1, a typical digital transmission system may contain a first (network or central office site-associated) transceiver unit 10 that is coupled to a first (e.g., central office) end 21 of a single twisted pair of telephone wires (or span) 20, and a second (remote site-associated) transceiver unit 30 coupled to a remote end 22 of the twisted pair 20. Also, the central office transceiver unit 10 may be equipped to supply electrical power over twisted pair 20 to remote transceiver 30.

In such a 'span-powering' configuration, it is often desirable for multiple central office transceiver units to provide span power for their respective remote transceiver units from a common or shared electrical power source. For system reliability, a fault-induced transient occurring on any one of the respective twisted pairs powered from the same power source must not be allowed to propagate to the other twisted pair lines, and thereby disrupt the operation of multiple transceivers.

Transceiver disturbance can also occur during an input capacitor charging-current transient, which occurs when a remote transceiver unit is initially connected in an operating system. This type of transceiver disturbance is also not permitted by system reliability requirements.

Once the magnitude of the input voltage being supplied to a remote transceiver unit has increased to a value where nominal operation begins, the remote transceiver unit will present a constant power electrical load to the central office unit power supply. Fault isolation and transient charging current isolation must be compatible with this type of load.

SUMMARY OF THE INVENTION

In accordance with the present invention, this objective is successfully achieved by means of a power interfacing method and arrangement that perform fault isolation and transient load isolation in a wireline communication network having multiple transceiver equipments connected by way of respectively different span-powered wireline links to a common power source installed at a network facility, such as a central office. For purposes of providing a non-limiting example, the invention will be described in connection with a span-powered High bit rate Digital Subscriber Line—Second Generation (HDSL2) telecommunication system, wherein a plurality of remote (HDSL2) transceivers communicate with and receive electrical power via a span-powered communication link from a common electrical power source (such as may be installed in or coupled to a central office facility).

Pursuant to the invention, each central office span-powering transceiver contains current-limiting circuitry installed in the span-powered wireline path to an associated remote transceiver, the remote receiver presenting to the wireline a capacitive input constant power load. This current-limiting circuitry is operative to process electrical power supplied from the common power source prior to coupling that power to the respective downstream transceiver. In particular, the current-limiting circuitry is operative to provide twisted pair fault isolation and also input capacitance transient charging current isolation.

A twisted pair fault means an effective shorting together of the two conductors of the electrically powered span, which would cause the central office transceiver to supply electrical current in excess of that for a nominal load condition. Input capacitance transient charging current isolation refers to a large transient capacitance-charging current flowing when a remote transceiver having a capacitive input is connected to an operating system. This current transient can be large enough to produce an associated span power bus voltage transient of such a high level that other remote transceivers will not operate properly, resulting in data errors or loss of synchronization on the digital subscriber line.

The current-limiting circuitry of the invention contains a linear current regulator that limits the powered wireline current to a prescribed value, so that the span voltage will not be reduced, and the remote transceivers powered thereby will not be disturbed. The linear current regulator is configured as a closed loop, negative feedback control system, containing a high gain operational amplifier. The high gain amplifier monitors the current flowing through a current-sense resistor coupled in circuit with the twisted pair, and controls the operation of a current-limiting device, such as a power MOSFET, installed in series with the current-sense resistor in the span-powered line. The voltage across the sense-resistor serves as a feedback signal to the high gain amplifier. Current regulation is achieved by regulating a constant voltage across this resistor, the voltage value being based upon the value of the resistor and the magnitude of a reference voltage. The high gain of the feedback circuit causes the feedback voltage to be regulated at the same voltage level as the reference voltage.

In addition to the above-described current regulation function, the invention limits capacitive charging current for a remote transceiver to a level that will not cause a significant span power bus voltage transient. In particular, the capacitive input of a remote transceiver as it is being connected to an operating system will be charged at a constant current from the fault isolation circuit until the input voltage to the remote transceiver reaches the span power bus voltage level.

To prevent substantial power dissipation in the power MOSFET during a prolonged twisted pair fault condition, the MOSFET is alternately turned on and off by a pair of ON and OFF timer circuits. The ON-timer circuit contains a first comparator, that compares the output of the high gain amplifier with a reference voltage. The internal circuitry of the first comparator has a transistor open-collector output with its emitter connected to ground. The output of the first comparator is coupled to a second comparator and to an ON-time capacitor. The output of the second comparator serves as a control input to a first output transistor, which is coupled to the power MOSFET.

An ON timing cycle begins when the output voltage of the high gain operational amplifier is reduced during linear current regulation. This reduces the input to the first comparator, so that its output appears as an open circuit. As a result, the ON-time capacitor starts to charge. The length of time for the voltage across the ON-time capacitor to reach a predetermined voltage establishes the ON-time of the power MOSFET. In the case of charging the input capacitance of a remote transceiver, the voltage across the ON-time capacitor will not reach the voltage detect level of the second comparator, since the input voltage to the first comparator increases as the load current to the remote transceiver returns to a normal steady state level. An increased voltage applied to the first comparator causes its open collector output transistor to turn on. This causes the ON-time capacitor to discharge and resets the ON timer circuit.

In the event of a fault in a twisted wireline pair, the voltage across the ON-time capacitor of the ON-timer circuit will reach the detect level of the second comparator and will subsequently turn off the controlled power MOSFET. This starts an OFF timing cycle by decreasing the voltage applied to a third comparator within the OFF timer circuit. Like the first comparator of the ON timer circuit, the internal circuitry of the third comparator within the OFF timer circuit has a transistor open-collector output with its emitter connected to ground. The output of the third comparator is coupled to a fourth comparator and to an OFF-time capacitor. The output of the fourth comparator serves as a control input to a monostable multivibrator (one-shot). The one-shot is used to prolong the duration of a RESET signal sufficient to discharge the timing capacitors. The one-shot is transistor-coupled to the first comparator of the ON timer circuit.

Within the OFF timer circuit, the fourth comparator detects when the voltage across its associated OFF-time capacitor reaches a prescribed voltage, to produce an output RESET signal. This RESET signal is coupled to and triggers the operation of the one-shot. The output of the one-shot begins a timer reset by reducing the voltage applied to the first comparator of the ON timer circuit. This causes the open collector output transistor of the first comparator to turn on, and discharge the ON-time capacitor of the ON timer circuit. As the ON-time capacitor discharges, its voltage eventually drops to a value that causes the open collector output transistor of the third comparator within the OFF timer circuit to turn on. This initiates the discharge of the OFF-time capacitor in the OFF timer, and resets the OFF timer circuit. This alternating ON/OFF cycle continues, until the twisted wire pair fault is removed.

DETAILED DESCRIPTION

Figure 1:
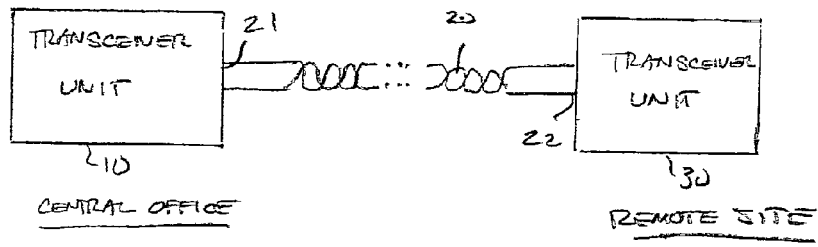
FIG. 1 diagrammatically illustrates a typical digital transmission system containing network and remote transceiver units coupled to respective portions of a single twisted telephone line pair used to supply span power to the remote transceiver unit.

Before detailing the technique for isolating faults and transient loads for multiple electrical loads connected by way of respective wireline segments to a common electrical power source in accordance with the present invention, it should be observed that the invention resides primarily in a prescribed arrangement of conventional communication circuits and components, and control circuitry that controls the operations of such circuits and components. Consequently, in the drawings, the configuration of such circuits and components, and the manner in which they may be interfaced with various telecommunication circuits have, for the most part, been illustrated by readily understandable block diagrams, which show only those specific details that are pertinent to the present invention, so as not to obscure the disclosure with details which will be readily apparent to those skilled in the art having the benefit of the description herein. Thus, the block diagrams of the Figures are primarily intended to show the various components of the invention in convenient functional groupings, so that the present invention may be more readily understood.

Figure 2:
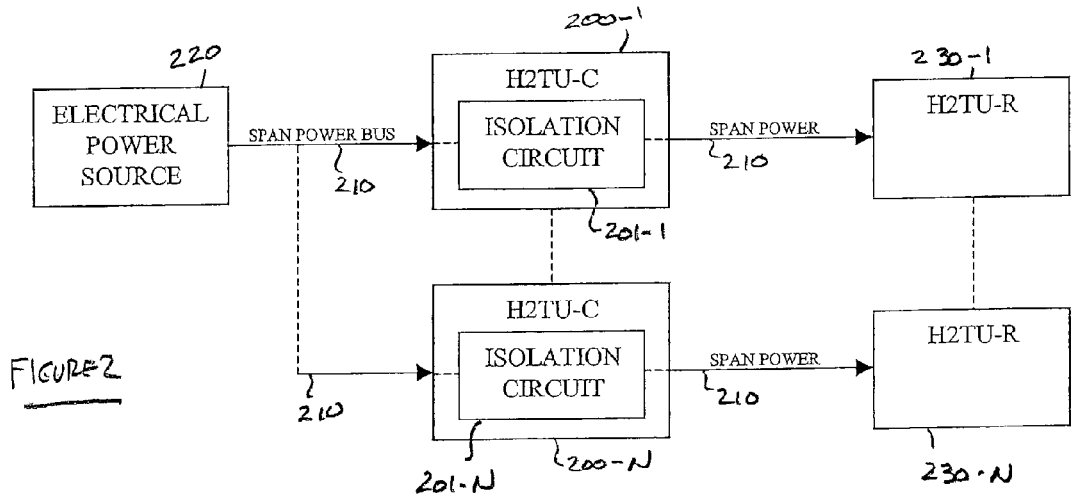
FIG. 2 diagrammatically illustrates the general architecture of an HDSL2 telecommunication system containing the current-limiting, fault isolation circuit of the invention.

Attention is now directed to FIG. 2, which diagrammatically illustrates the general architecture of a span-powered High bit rate Digital Subscriber Line—Second Generation (HDSL2) telecommunication system. The system of FIG. 2 includes an arbitrary plurality (two being shown to reduce the complexity of the drawing) of functional HDSL2 Transceiver Units-Central Office (H2TU-C) 200-1, . . . , 200-N, which conduct DSL communications over, and receive their electrical power by way of a span powered bus 210 from a common electrical power source 220. Within each H2TU-C 200-i (where i represents the ith unit in the system), span power from source 220 is processed by an isolation circuit 201-i, prior to being delivered to a respective downstream functional HDSL2 Transceiver Unit-Remote (H2TU-R) 230-i, which presents a capacitive input constant power load. Isolation circuit 201-i provides twisted pair fault isolation and also H2TU-R input capacitance transient charging current isolation.

A twisted pair fault means that the two conductors of the span 210 become effectively shorted or connected together by a very low or zero ohm impedance, such that the H2TU-C unit 200-i must supply span power-based electrical current in excess of that for a nominal load condition. Without fault isolation circuitry, the span power bus voltage is reduced to a level such that the other H2TU-R units 230 will not operate properly, causing data errors on the digital subscriber line. In accordance with the present invention, this is prevented by the current limiting function of the fault isolation circuit 201-i in each H2TU-C unit 200-i. As pointed out briefly above, and as described below with reference to FIG. 3, a linear current regulator within the fault isolation circuit 201 limits the current to a set value, so that the span power bus voltage will not be reduced, and the H2TU-R units 230 will not be disturbed.

Figure 3:
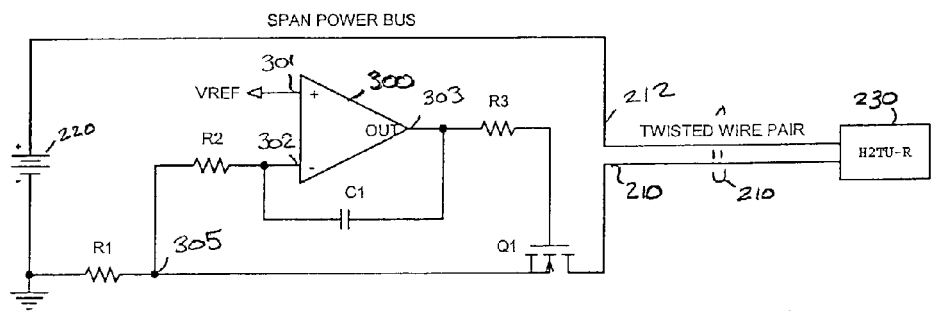
FIG. 3 shows a linear current regulator used in the fault isolation circuit of the invention.

More particularly, the linear current regulator of FIG. 3 is configured as a closed loop, negative feedback control system containing a high gain operational amplifier 300 having its non-inverting (+) input 301 coupled to a prescribed reference voltage VREF, and its inverting (−) input 302 coupled through an input resistor R2 to a common node 305 of a grounded current-sense resistor R1 and a controlled current flow device (shown as a power MOSFET Q1). Namely, power MOSFET Q1 is operated in its linear region and functions as a controlled variable resistor to set the current level through the span. The current flow path through MOSFET Q1 to a first lead 211 of the twisted wire pair 210 is controlled by output 303 of operational amplifier 300, which is coupled to the gate of MOSFET Q1 via an output resistor R3. A feedback capacitor C1 is coupled between output 303 and the inverting (−) input 302 of the operational amplifier 300. A second lead 212 of twisted pair 210 is coupled to the electrical power source (battery) 220.

In operation, with power MOSFET Q1 being turned-on, the current flowing through the span-powered twisted pair 210 flows through the series connection of MOSFET Q1 and the current-sense resistor R1, and is converted from a current $I_{R1}$ to a voltage by the current sense resistor R1. The voltage across resistor R1 serves as a feedback signal to the inverting (−) input 302 of amplifier 300. The high gain of the feedback circuit causes the feedback signal to be regulated at the same voltage level as the reference voltage VREF applied to the non-inverting (+) input 301 of operational amplifier 300.

Current regulation is achieved by regulating a constant voltage across the current-sense resistor R1. The current set point is controlled by the value of current-sense resistor R1 and the magnitude of the reference voltage VREF. The regulated current $I_{REG}$ is defined as: $I_{REG} = I_{R1} = VREF/R1$.

When an H2TU-R 230-$i$ having a capacitive input is connected to an operating system, a large transient capacitor-charging current will flow. Without current-limiting, this current can be large enough to cause a span power bus voltage transient of such a high level that the other H2TU-R's will not operate properly and cause data errors on the digital subscriber line. This problem is also eliminated by the linear current regulation function of the fault isolation circuit, described above. In particular, the fault isolation circuit limits the capacitive charging current to a level that will not cause a significant span power bus voltage transient. The capacitive input of the H2TU-R will be charged at a constant current from fault isolation circuit 201 until the input voltage to the H2TU-R 230 reaches the span power bus voltage level.

A substantial amount of power can be dissipated in power MOSFET Q1 during a prolonged twisted pair fault condition. Such power dissipation can cause power MOSFET Q1 to overheat and fail. In order to prevent it from overheating, MOSFET Q1 can be alternately turned on and off, like a switch. This has the effect of modulating or controllably interrupting current flow and thereby eliminating power dissipation during its off time. By appropriate control of its duty factor or the ratio of on-time to off-time, power dissipation in MOSFET Q1 can be made effectively insignificant.

Figure 4:
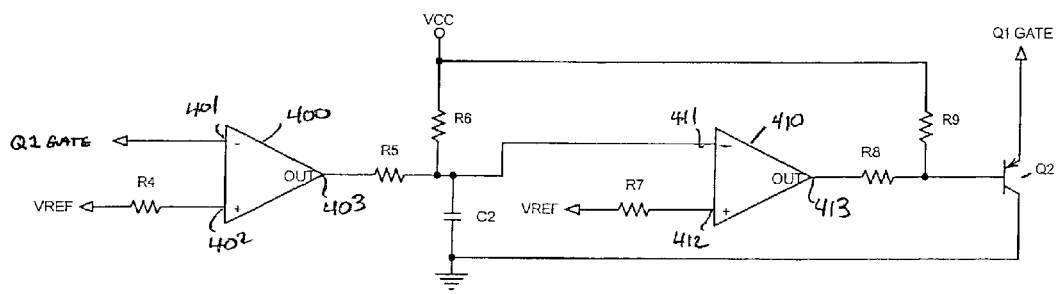
FIG. 4 shows the circuit configuration of an ON timer for controlling the ON-time of the power MOSFET of the linear current regulator of the fault isolation circuit of the invention.
Figure 5:
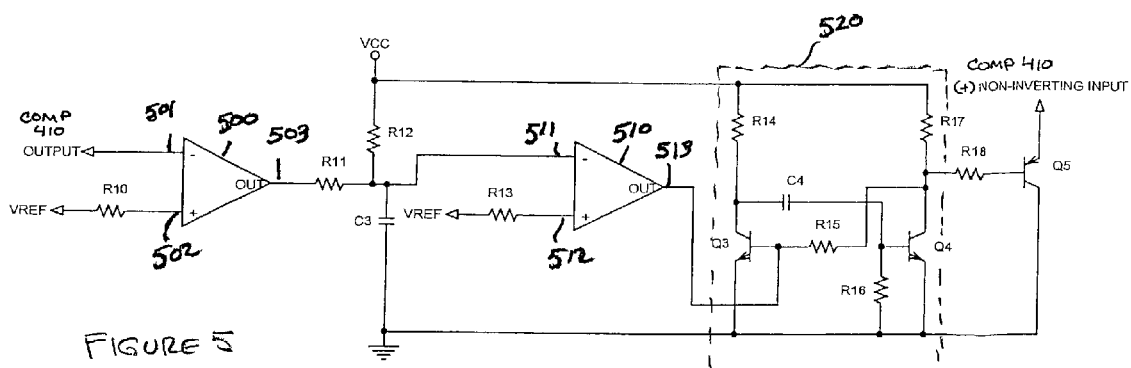
FIG. 5 shows the circuit configuration of an OFF timer for controlling the OFF-time of the power MOSFET of the linear current regulator of the fault isolation circuit of the invention.

FIGS. 4 and 5 respectively illustrate two timer circuits that may be employed to control the ON time and the OFF time of the power MOSFET Q1 in the linear current regulator of FIG. 3. The ON-time of MOSFET Q1 is set by comparators 400 and 410 of the ON timer circuit of FIG. 4. The internal circuitry of comparator 400 has a transistor open-collector output with its emitter connected to ground. A first, inverting (−) input 401 of comparator 400 is coupled through output resistor R3 to the output 303 of amplifier 300 of the linear current regulator of FIG. 3. A second, non-inverting (+) input 402 of comparator 400 is coupled through an input resistor R4 to voltage VREF. The output 403 of comparator 400 is coupled through a resistor R5 to the inverting (−) input 411 of a comparator 410, whose output 413 is coupled through an output resistor R8 to the base of an output bipolar (PNP) transistor Q2. A second, non-inverting (+) input 412 of comparator 410 is coupled through an input resistor R7 to voltage VREF. The inverting input 411 of comparator 410 is further coupled through a resistor R6 to a bias voltage rail VCC and to a grounded, ON-time capacitor C2. The collector of output PNP transistor Q2 is coupled to ground, while it emitter is coupled to the gate of the power MOSFET Q1 of the linear regulator of FIG. 3.

A timing cycle is initiated when the output voltage of the operational amplifier 300 of the regulator of FIG. 3 is reduced during linear current regulation. This causes the inverting (−) input 401 of comparator 400 to be reduced below non-inverting (+) input 402 of comparator 400 and its output 403 to appear as an open circuit. As a result, the ON-time capacitor C2 begins charging through resistor R6 and charging time is detected by comparator 410 when the voltage across ON-time capacitor C2 reaches a prescribed voltage. The ON-time of MOSFET Q1 is established by the values of resistor R6 and ON-time capacitor C2 and must be longer than the time required to charge the H2TU-R input capacitance.

During the charging of the input capacitance of the remote transceiver, the voltage across ON-time capacitor C2 will not reach the voltage detect level of comparator 410, since the input voltage to upstream comparator 400 increases, as the load current to the H2TU-R returns to normal steady state levels. An increased voltage applied to the inverting (−) input 401 of comparator 400 causes its open collector output transistor to turn on, which then discharges ON-time capacitor C2 and resets the ON timer circuit of FIG. 4. R5 resistor value is chosen to be much smaller than R6 to insure nearly complete discharge of C2.

In the case of an extended twisted wireline pair fault, the voltage across ON-time capacitor C2 voltage will reach the detect level of comparator 410 and will subsequently turn the MOSFET Q1 OFF (via output transistor Q2), and begin an OFF timing cycle by decreasing the voltage on a first, inverting (−) input 501 of a comparator 500 of the OFF timer circuit of FIG. 5. For this purpose, inverting (−) input 501 of comparator 500 is coupled to the output 413 of the second comparator 410 in the ON timer circuit of FIG. 4. A second, non-inverting (+) input 502 of comparator 500 is coupled through an input resistor R10 to voltage VREF.

The output 503 of comparator 500 is coupled through a resistor R11 to the inverting (−) input 511 of a comparator 510, whose output 513 is coupled to the base of an NPN transistor Q3 of a monostable multivibrator or one-shot 520. The monostable multivibrator is used to prolong the duration of a RESET signal sufficient to discharge the timing capacitors. A second, non-inverting (+) input 512 of comparator 510 is coupled through an input resistor R13 to voltage VREF. The inverting input 511 of comparator 510 is further coupled through a resistor R12 to bias voltage rail VCC and to a grounded, OFF-time capacitor C3. Within one-shot 520, the collector of transistor Q3 is coupled through resistor R14 to VCC, while it emitter is coupled to ground. The collector of transistor Q3 is further coupled through a one-shot time constant capacitor C4 to the common connection of the base of NPN transistor Q4 and a grounded resistor R16. The emitter of NPN transistor Q4 is coupled to ground, while its collector is coupled through resistor R17 to the VCC rail, and through resistor R18 to the base of an output PNP transistor Q5. The collector of output transistor Q5 is grounded, while its emitter is coupled to non-inverting input 412 of comparator 410.

Within the OFF timer circuit of FIG. 5, comparator 500, resistor R12 and OFF-time capacitor C3 operate in the effectively same manner as comparator 400, resistor R6 and ON-time capacitor C2 of the ON timer circuit of FIG. 4, described above. Namely, comparator 510 detects when the voltage across the OFF-time capacitor C3 reaches a prescribed voltage, to produce an output RESET signal at its output 513. This RESET signal is coupled to and triggers the operation of monostable multivibrator 520. The output of monostable multivibrator 520 begins a timer reset action by reducing the voltage applied to the non-inverting (+) input 412 to comparator 400 through transistor Q5. This causes the open collector output transistor of comparator 400 to turn on, and discharge the ON-time capacitor C2. As the ON-time capacitor C2 discharges, its voltage eventually causes the open collector output transistor of comparator 500 within the OFF timer circuit to turn on. This initiates the discharge of OFF-time capacitor C3, and resets the OFF timer circuit of FIG. 5. This ON/OFF cycle will continue to repeat, until the twisted wire pair fault is removed.

As will be appreciated from the foregoing description, fault isolation and transient load isolation in a wireline communication network containing multiple transceivers, that are connected by way of respectively different span-powered wireline links to a common power source at a network facility, are successfully achieved in accordance with the present invention by equipping each central office transceiver with current-limiting circuitry that is coupled with the span-powered wireline path to its associated remote transceiver. This current-limiting circuitry processes electrical power supplied from the common power source prior to coupling that power to the respective downstream transceiver, in a manner that provides twisted pair fault isolation and input capacitance transient charging current isolation. To prevent overheating and substantial power dissipation in a power MOSFET of the current-limiting circuitry in the event of a prolonged twisted pair fault condition, the power MOSFET is alternately turned on and off by a pair of ON and OFF timer circuits.

While we have shown and described an embodiment in accordance with the present invention, it is to be understood that the same is not limited thereto but is susceptible to numerous changes and modifications as known to a person skilled in the art. We therefore do not wish to be limited to the details shown and described herein, but intend to cover all such changes and modifications as are obvious to one of ordinary skill in the art.

What is claimed:

1. A method of supplying electrical power from a power source, over a plurality of telecommunication wirelines from network facility digital telecommunication transceivers to remote site digital telecommunication transceivers associated therewith, said method comprising the steps of:
    (a) supplying electrical power from said power source over a span power bus to each of said network facility digital telecommunication transceivers; and
    (b) at each of said network facility digital telecommunication transceivers, controllably coupling electrical power supplied by way of said span power bus to a respective telecommunication wireline for delivery to an associated remote site digital telecommunication transceiver coupled thereto, by controllably limiting current flow through said respective telecommunication wireline in a manner that prevents a fault-induced transient occurring on any of plurality of telecommunication wirelines from propagating to any other of said plurality telecommunication wirelines, and thereby preventing misoperation of remote site digital telecommunication transceivers coupled thereto.

2. The method according to claim 1, wherein step (b) comprises regulating current flow through said respective telecommunication wireline to a value that effectively prevents a reduction in voltage provided by said span power bus.

3. The method according to claim 2, wherein step (b) comprises:
    (b1) coupling a current-sense resistor and a current-limiting device in series with said respective telecommunication wireline,
    (b2) monitoring a voltage across said current-sense resistor,
    (b3) controlling said current-limiting device in accordance with said voltage across said current-sense resistor, so that current flow through said respective telecommunication wireline is regulated to said value that effectively prevents a reduction in voltage provided by said span power bus.

4. The method according to claim 3, wherein step (b3) includes comparing said voltage across said current-sense resistor with a reference voltage, and controlling said current-limiting device in accordance with a prescribed relationship between said voltage across said current-sense resistor and said reference voltage.

5. The method according to claim 3, wherein step (b3) includes controlling said current-limiting device so as to maintain a constant voltage across said current-sense resistor.

6. The method according to claim 1, wherein step (b) comprises coupling a current-limiting device in series with said respective telecommunication wireline, and regulating current flow through said current-limiting device and thereby through said respective telecommunication wireline.

7. The method according to claim 6, wherein step (b) comprises modulating current flow through said current-limiting device in a manner that reduces heat dissipation in said current-limiting device, while regulating current flow through said current-limiting device and thereby through said respective telecommunication wireline.

8. The method according to claim 6, wherein step (b) comprises alternately turning said current-limiting device on and off so as to reduce heat dissipation in said current-limiting device, while regulating current flow through said current-limiting device and thereby through said respective telecommunication wireline to a value that effectively prevents a reduction in voltage provided by said span power bus.

9. The method according to claim 1, wherein step (b) comprises controllably limiting current flow through said respective telecommunication wireline, by performing at least one of telecommunication wireline fault isolation and remote digital telecommunication transceiver input capacitance transient charging current isolation with respect to said respective telecommunication wireline.

10. An arrangement for span-powering a plurality of remote digital telecommunication transceivers from a shared source of electrical power, said shared source of electrical power being coupled over a span power bus to a plurality of network facility digital telecommunication transceivers, said arrangement comprising, at each of said plurality of network facility digital telecommunication transceivers:
    a controlled path that is operative to couple said span power bus to a respective one of a plurality of telecommunication wirelines through which said network facility digital telecommunication transceivers conduct digital telecommunications with said remote digital telecommunication transceivers; and a current-regulator that is operative to controllably limit current flow through said respective one of said plurality of telecommunication wirelines, in a manner that prevents a fault-induced transient on any of said plurality of telecommunication wirelines from propagating to any other of said plurality of telecommunication wirelines, and thereby preventing misoperation of remote site digital telecommunication transceivers coupled thereto.

11. The arrangement according to claim 10, wherein said current-regulator is operative to controllably regulate current flow through said respective telecommunication wireline to a value that effectively prevents a reduction in voltage provided by said span power bus.

12. The arrangement according to claim 11, wherein said controlled path includes a current-sense resistor and a current-limiting device coupled in series with said respective telecommunication wireline, and wherein said current-regulator is operative to monitor a voltage across said current-sense resistor and to control said current-limiting device in accordance with said voltage across said current-sense resistor, so that current flow through said respective telecommunication wireline is regulated to said value that effectively prevents a reduction in voltage provided by said span power bus.

13. The arrangement according to claim 12, wherein said current-regulator includes a comparator that is operative to compare said voltage across said current-sense resistor with a reference voltage, and to control said current-limiting device in accordance with a prescribed relationship between said voltage across said current-sense resistor and said reference voltage.

14. The arrangement according to claim 13, wherein said current-regulator is operative to control said current-limiting device so as to maintain a constant voltage across said current-sense resistor.

15. The arrangement according to claim 10, wherein said controlled path includes a current-limiting device coupled in series with said respective telecommunication wireline, and wherein said current-regulator is operative to regulate current flow through said current-limiting device and thereby through said respective telecommunication wireline.

16. The arrangement according to claim 15, wherein said current-regulator is operative to cause said current-limiting device to modulate current flow therethrough, in a manner that reduces heat dissipation, while regulating current flow through said respective telecommunication wireline.

17. The arrangement according to claim 15, wherein said current-regulator is operative to alternately turn said current-limiting device on and off, so as to reduce heat dissipation in said current-limiting device, while regulating current flow through said current-limiting device and thereby through said respective telecommunication wireline to a value that effectively prevents a reduction in voltage provided by said span power bus.

18. The arrangement according to claim 10, wherein said current-regulator is operative to controllably limit current flow through said respective telecommunication wireline, by performing at least one of telecommunication wireline fault isolation and remote digital telecommunication transceiver input capacitance transient charging current isolation with respect to said respective telecommunication wireline.

19. An apparatus for span-powering a remote transceiver from a source of electrical power that is coupled over a common link to a plurality of network facility transceivers, each network facility transceiver being coupled to a respective wireline through which said network facility transceiver conducts communications with said remote transceiver, said apparatus comprising:

a current-limiting path that is operative to couple said span power bus to said respective wireline; and a current-regulator that is operative to limit current through said current-limiting path, and thereby to said respective wireline, in a manner that prevents a fault-induced transient on any of said plurality of wirelines from propagating to other wirelines, and thereby prevents misoperation of remote transceivers coupled thereto.

20. The apparatus according to claim 19, wherein said current-regulator is operative to controllably regulate current flow through said respective wireline to a value that effectively prevents a reduction in voltage provided by said common link.

21. The apparatus according to claim 20, wherein said current-limiting path includes a current-sense resistor and a current-limiting device coupled in series with said respective wireline, and wherein said current-regulator is operative to monitor a voltage across said current-sense resistor and to control said current-limiting device in accordance with said voltage across said current-sense resistor, so that current flow through said respective wireline is regulated to said value that effectively prevents a reduction in voltage on said common link.

* * * * *

UNITED STATES PATENT AND TRADEMARK OFFICE
CERTIFICATE OF CORRECTION

PATENT NO.       : 6,982,860 B2
APPLICATION NO.  : 10/293141
DATED            : January 3, 2006
INVENTOR(S)      : Scott L. Smith and Steven M. Robinson It is certified that error appears in the above-identified patent and that said Letters Patent is hereby corrected as shown below:

Column 7, Line 49   Delete: Claim 1
Insert: New Claim 1

-- 1. A method of supplying electrical power from a power source, over a plurality of telecommunication wirelines from network facility digital telecommunication transceivers to remote site digital telecommunication transceivers associated therewith, said method comprising the steps of:

(a) supplying electrical power from said power source over a span power bus to each of said network facility digital telecommunication transceivers; and (b) at each of said network facility digital telecommunication transceivers, controllably coupling electrical power supplied by way of said span power bus to a respective telecommunication wireline for delivery to an associated remote site digital telecommunication transceiver coupled thereto, by independently sensing current flowing through said respective telecommunication wireline and controllably limiting current flow through said respective telecommunication wireline based upon the sensed current flowing only through said respective telecommunication wireline, irrespective of current flowing to any another telecommunication wireline, so as to prevent a fault-induced transient occurring on said respective telecommunication wireline from propagating to any other of said plurality telecommunication wirelines, and thereby preventing misoperation of remote site digital telecommunication transceivers coupled thereto. --

UNITED STATES PATENT AND TRADEMARK OFFICE
CERTIFICATE OF CORRECTION

PATENT NO. : 6,982,860 B2
APPLICATION NO. : 10/293141
DATED : January 3, 2006
INVENTOR(S) : Scott L. Smith and Steven M. Robinson It is certified that error appears in the above-identified patent and that said Letters Patent is hereby corrected as shown below:

Column 8, Line 57   Delete: Claim 10

Insert: New Claim 10

-- 10. An arrangement for span-powering a plurality of remote digital telecommunication transceivers from a shared source of electrical power, said shared source of electrical power being coupled over a span power bus to a plurality of network facility digital telecommunication transceivers, said arrangement comprising, at each of said plurality of network facility digital telecommunication transceivers:

a controlled path that is operative to couple said span power bus to a respective one of a plurality of telecommunication wirelines through which said network facility digital telecomunication transceivers conduct digtial telecommunications with said remote digital telecommunications transceivers; and a current-regulator that is operative to independently sense current flowing through said respective one of said plurality of telecommunication wirelines and controllably limit current flow through said respective one of said plurality of telecommunication wirelines, based upon the sensed current flowing only through said respective one of said plurality of telecommunication wirelines, irrespective of current flowing through any other telecommunication wireline, so as to prevent a fault-induced transient on said respective one of said plurality of telecommunication wirelines from propagating to any other of said plurality of telecommunication wirelines, and thereby preventing misoperation of remote site digital telecommunication transceivers coupled thereto. --

UNITED STATES PATENT AND TRADEMARK OFFICE
CERTIFICATE OF CORRECTION

| | | |
|---|---|---|
| PATENT NO. | : 6,982,860 B2 | |
| APPLICATION NO. | : 10/293141 | |
| DATED | : January 3, 2006 | |
| INVENTOR(S) | : Scott L. Smith and Steven M. Robinson | |

It is certified that error appears in the above-identified patent and that said Letters Patent is hereby corrected as shown below:

Column 10, Line 16    Delete: Claim 19

Insert: New Claim 19

-- 19. An apparatus for span-powering a remote transceiver from a source of electrical power that is coupled over a common link to a plurality of network facility transceivers, each network facility transceiver being coupled to a respective wireline through which said network facility transceiver conducts communications with said remote transceiver, said apparatus comprising:

a current-limiting path that is operative to couple said span power bus to said respective wireline; and a current-regulator that is operative to sense current flowing only through said respective wireline and to limit current through said current-limiting path, and thereby to said respective wireline, based upon the sensed current flowing only through said repective wireline, irrespective of current flowing through any other wireline to any other remote receiver, so as to prevent a fault-induced transient on said respective wireline from propagating to other wirelines, and thereby prevents misoperation of remote transceivers coupled thereto. --

UNITED STATES PATENT AND TRADEMARK OFFICE
CERTIFICATE OF CORRECTION

PATENT NO. : 6,982,860 B2
APPLICATION NO. : 10/293141
DATED : January 3, 2006
INVENTOR(S) : Scott L. Smith and Steven M. Robinson It is certified that error appears in the above-identified patent and that said Letters Patent is hereby corrected as shown below:

Patent Face        Delete: Published Figure

Insert: New Published Figure

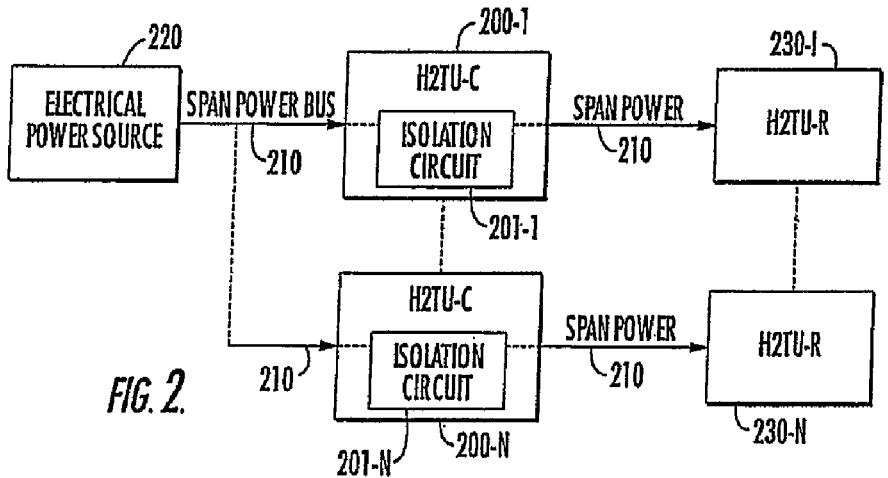

In the Drawings    Delete: Figure 1

Insert: New Figure 1

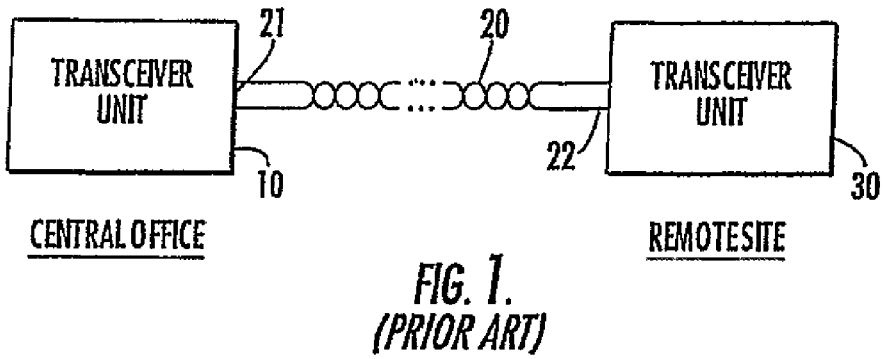

UNITED STATES PATENT AND TRADEMARK OFFICE
CERTIFICATE OF CORRECTION

PATENT NO.       : 6,982,860 B2                                         Page 5 of 6
APPLICATION NO.  : 10/293141
DATED            : January 3, 2006
INVENTOR(S)      : Scott L. Smith and Steven M. Robinson It is certified that error appears in the above-identified patent and that said Letters Patent is hereby corrected as shown below:

In the Drawings        Delete: Figure 2

Insert: New Figure 2

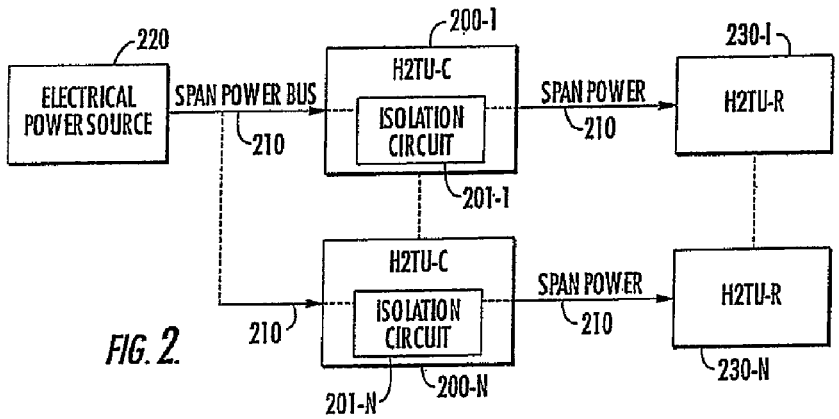

FIG. 2

In the Drawings        Delete: Figure 3

Insert: New Figure 3

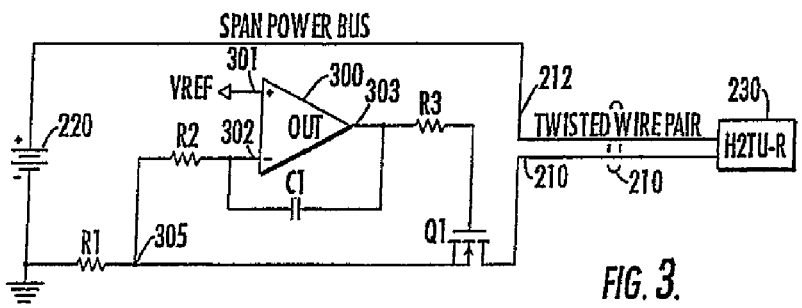

FIG. 3.

In the Drawings        Delete: Figure 4

Insert: New Figure 4

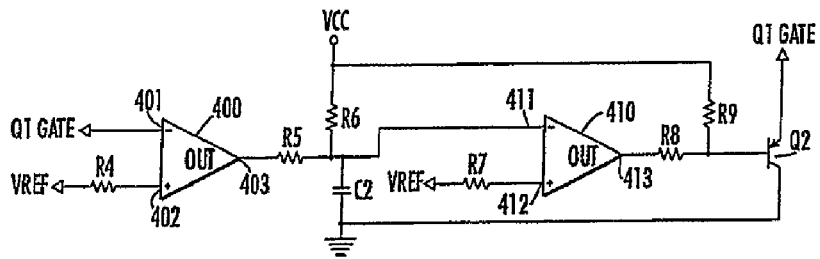

FIG. 4.

UNITED STATES PATENT AND TRADEMARK OFFICE
CERTIFICATE OF CORRECTION

PATENT NO.      : 6,982,860 B2
APPLICATION NO. : 10/293141
DATED           : January 3, 2006
INVENTOR(S)     : Scott L. Smith and Steven M. Robinson It is certified that error appears in the above-identified patent and that said Letters Patent is hereby corrected as shown below:

In the Drawings    Delete: Figure 5
                   Insert: New Figure 5

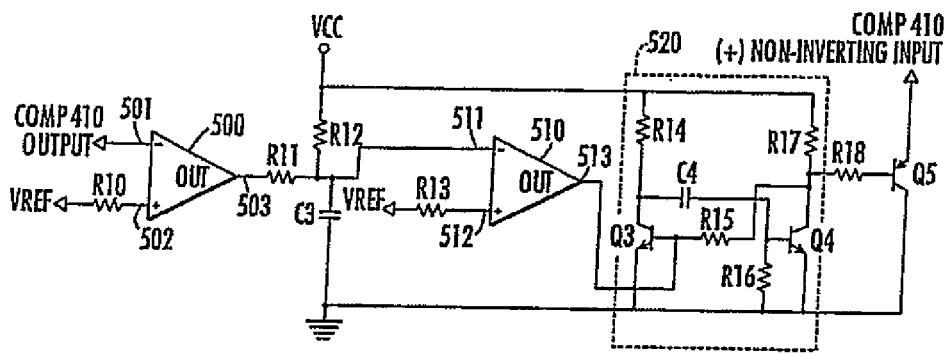

FIG. 5.

Signed and Sealed this

Twentieth Day of February, 2007

JON W. DUDAS
*Director of the United States Patent and Trademark Office*